…

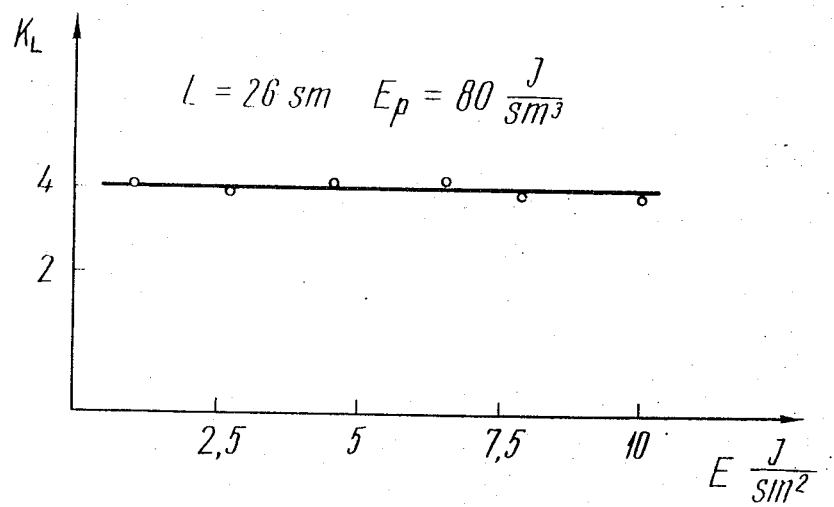

United States Patent Office 3,846,142
Patented Nov. 5, 1974

3,846,142
Nd AND Yb CONTAINING PHOSPHATE GLASSES FOR LASER USE
Igor Mikhailovich Buzhinsky, Pervomaiskaya ulitsa 5, kv. 46, Lytkarino Moskovskoi oblasti, U.S.S.R.; Valentin Pavlovich Gapontsev, ulitsa Godovikova 1, kv. 110; and Mark Efremovich Zhabotinsky, Pogodinskaya ulitsa 2/3, kv. 53, both of Moscow, U.S.S.R.; Anatoly Andreevich Izyneev, Vokzalnaya ulitsa 19, kv. 18, Fryazino Moskovskoi oblasti, U.S.S.R.; Elizaveta Ivanovna Koryagina, Oktyabraskaya ulitsa 15, kv. 31, Lytharino Moskovskoi oblasti, U.S.S.R.; Valery Borisovich Kravchenko, ulitsa Lenina 14, kv. 47, Fryazino Moskovskoi oblasti, U.S.S.R.; Jury Petrovich Rudnitsky, ulitsa Ostrovityanova 31, kv. 298; Evgeny Ivanovich Sverchkov, ulitsa Butyrsky val 32, kv. 61; and Nikolai Efimovich Alexeev, ulitsa Gorkogo 8, korpus 1, kv. 21, all of Moscow, U.S.S.R.; and Boris Leonidovich Davydov, ulitsa Nakhimova 17, kv. 63, Fryazino Moskovskoi Oblasti, U.S.S.R.
No Drawing. Filed Sept. 18, 1972, Ser. No. 290,146
Int. Cl. C03c 3/16, 3/30; C09k 1/36
U.S. Cl. 106—47 R  8 Claims

ABSTRACT OF THE DISCLOSURE

Phosphate base glass used in laser apparatus generating and amplifying high-energy light monopulses having a duration of less than $10^{-6}$ sec. on $\lambda=1060$ nm. The glass containing metaphosphates of the elements Li and/or Na, and/or K, and/or Mg, and/or Ca, and/or Sr, and/or Cd, and/or Ba, and/or Pb, in the amount of 40–90%, phosphates of elements Al and/or Zr, and/or B, and/or Ba, and/or Ce in the amount of 5–50%, trivalent neodymium $Nd^{3+}$ in the amount of 1–7% and trivalent ytterbium $Yb^{3+}$ in the amount of 0.1–5.0%. The glass is characterized by high specific energy stored by $Yb^{3+}$ in the active element at a section of stimulated emission of at least $2.5 \cdot 10^{-21}$ cm.$^2$.

---

The present invention relates to glass compositions and, more particularly, to glass for laser use in quantum electronics and intended for the generation and amplification of stimulated emission, namely for the generation and amplification of high-power monopulses and a duration less than $10^{-6}$ sec. at $\lambda=1060$ nm.

At present there are known phosphate base glass materials for laser use and having the following composition in weight percent:

| | |
|---|---|
| $La_2O_3$ | 14 |
| BaO | 23 |
| $P_2O_5$ | 60 |
| $Nd_2O_3$ | 3.0 |

These glass materials are activated with neodymium, i.e. they contain trivalent neodymium, $Nd^{3+}$.

Glasses of the above composition are disadvantageous in view of the presence of $Nd^{3+}$ as a working laser ion which features a high section of stimulated emission of approximately $2.5 \cdot 10^{-20}$ cm.$^2$.

This results in considerable complication of high-energy monopulse laser devices and in their efficiency being sharply diminished because of the necessity of building optical isolators into these devices.

Also known in the art are phosphate base glass materials having the following composition in percent by weight:

| | |
|---|---|
| $Li_2O$ | 2–40 |
| $Na_2O$ | 2–40 |
| $P_2O_5$ | 30–90 |
| $Al_2O_3$ | 0–5 |

This composition is activated with $Nd_2O_3$ and $Yb_2O_3$ taken together in the amount up to 15 percent by weight.

In this composition the working laser ion is $Yb^{3+}$ taken in the trivalent state, while ion $Nd^{3+}$ also taken in the trivalent state is used as a sensitizer, i.e. it consumes the energy of light pumping and transmitting it to $Yb^{3+}$.

The disadvantage of these glass compositions consists in a low section of radiation of stimulated emission of $Yb^{3+}$ at $\lambda=1060$ nm. equal to $2 \cdot 10^{-21}$ cm.$^2$.

In this case light fluxes up to $10^{21}$ photon/cm.$^2$ or 200 joule/cm.$^2$ are necessary for full recovery of the energy stored by $Yb^{3+}$.

Such fluxes are beyond the surface light resistance of the glass compositions during the monopulse operation of the laser.

Another disadvantage of the above glass compositions consists in that in the glass serving as an active element of the laser there appears a nonhomogeneous change in the refraction index (depending on the temperature gradient of the glass) equivalent to an optical lens, the sign and value of which depend on the energy of light pumping and the shape of the illumination unit.

Moreover, known in the art are silicate and borate base glasses in which oxides of the majority of metals of the Periodic Table are used as modifiers.

For the purpose of employing the known silicate and borate base glasses in monopulse laser devices, attempts have been made to activate them with neodymium $Nd^{3+}$.

Owing to the fact that $Nd^{3+}$ features high-intensity stimulated emission (higher than $1.5 \cdot 10^{-20}$ cm.$^2$), these attempts have given no positive results, since, as mentioned above, in this case, the laser devices must be considerably complex.

Also known in the art are silicate and borate base glasses activated with $Nd^{3+}$ and $Yb^{3+}$ in the trivalent state.

The common disadvantage of both borate and silicate glasses consists in that $Yb^{3+}$ in them has an extremely low section of stimulated emission at $\lambda=1060$ nm. equal to $1.0–1.5 \cdot 10^{-21}$ cm.$^2$.

In addition, silicate base glasses are disadvantageous in that in order for the energy to be completely taken off from $Nd^{3+}$, a high concentration of $Yb^{3+}$ is to be taken, which results in a high threshold energy of the laser.

Since borate base glasses are characterized by extremely low quantum yield and short life in excited condition ($7–8 \cdot 10^{-4}$ sec.), the energy characteristics of the laser devices are drastically deteriorated and this is also a significant disadvantage of borate base glasses.

An object of the present invention is to provide a glass composition which eliminates the above-mentioned disadvantages.

Another object of the invention is to provide high specific values of energy stored by $Yb^{3+}$ in active elements.

Still another object of the invention is to obtain an efficiency factor of lasers operating under monopulse conditions close to that obtained under conditions of free generation.

Yet another object of the invention is to provide conditions of internal Q-modulation resulting in generation of separated giant laser pulses without using external modulators.

A specific object of the invention is to provide such a composition of glass that provides a section of stimulated emission of $Yb^{3+}$ at $\lambda=1060$ nm. of $2.5–5 \cdot 10^{-21}$ cm.$^2$, a life of $Yb^{3+}$ of $1.0–1.8 \cdot 10^{-3}$ sec., a working concentration of $Yb^{3+}$ up to $3 \cdot 10^{20}$ cm.$^{-3}$, a low thermo-optic constant at adequate technological peculiarities.

These and other objects are attained by a glass composition containing metaphopshates of the elements Li and/or Na, and/or K, and/or Zn, and/or Cd, and/or Ba, and/or Pb as well as trivalent neodymium and ytterbium, and according to the invention, the glass composition also contains metaphosphates of the elements Mg and/or Ca, and/or Sr and phosphates of elements Al and/or Zr, and/or B, and/or Ce, in which case all the components are taken in the following quantities, in percent by weight: 40–90% of the metaphosphates of elements Li and/or Na, and/or K, and/or Mg, and/or Ca, and/or Sr, and/or Cd, and/or Ba, and/or Pb; 5–50% of the phosphates of elements Al and/or Zr, and/or B, and/or Ce; and 1–7% of $Nd^{3+}$; and 0.3–5.0% of $Yb^{3+}$.

Ionic uranyl, $UO_2^{2+}$, is preferably added as a brightening absorber in the amount of 0.1 to 1.0% by weight.

The phosphates of the elements Al, B, Ce, Zr may be replaced with the oxides $Al_2O_3$, $B_2O_3$, $CeO_2$, $ZrO_2$ and also $Nb_2O_5$, which replacement might be important for reducing the crystallizing capacity of the glasses, decreasing the temperature expansion coefficient and increasing the chemical resistance of the glass.

One particular composition of the glass, in percent by weight, is:

| | |
|---|---|
| $Ba(PO_3)_2$ | 40–70 |
| $Pb(PO_3)_2$ | 10–25 |
| $Al(PO_3)_3$ | 8–20 |
| $KPO_3$ | 1–10 |
| $Nd^{3+}$ | 1–5 |
| $Yb^{3+}$ | 1–3 |

Another particular composition of the glass, in percent by weight, is:

| | |
|---|---|
| $Pb(PO_3)_2$ | 60–80 |
| $Nb_2O_5$ | 1–10 |
| $KPO_3$ | 5–25 |
| $Nd^{3+}$ | 1–5 |
| $Yb^{3+}$ | 1–3 |

Another particular composition of the glass, in percent by weight, is:

| | |
|---|---|
| $KPO_3$ | 50–80 |
| $Mg(PO_3)_2$ | 15–30 |
| $B_2O_3$ | 8–15 |
| $CeO_2$ | 0.1–2 |
| $Nd^{3+}$ | 2–5 |
| $Yb^{3+}$ | 1–4 |
| $UO_2^{2+}$ | 0.1–10 |

A further particular composition of the glass, in percent by weight, is:

| | |
|---|---|
| $NaPO_3$ | 50–80 |
| $Mg(PO_3)_2$ | 15–30 |
| $B_2O_3$ | 8–15 |
| $CeO_2$ | 0.2–2.0 |
| $Nd^{3+}$ | 2–5 |
| $Yb^{3+}$ | 1–4 |

Another particular composition of the glass, in percent by weight, is:

| | |
|---|---|
| $Ba(PO_3)_2$ | 60–80 |
| $Al(PO_3)_3$ | 10–30 |
| $BPO_4$ | 1–10 |
| $CeO_2$ | 0.5–3.0 |
| $Nd^{3+}$ | 1–5 |
| $Yb^{3+}$ | 1–3 |

The proposed glass is advantageous in that it has a section of stimulated emission of $Yb^{3+}$ at $\lambda = 1060$ nm. up to $5 \cdot 10^{-21}$ cm.$^2$, and a life in a metastable state of $1.2-1.8 \cdot 10^{-3}$ sec. The energy stored at maximum inversion is equal to 4 joule/cm.$^3$ at a level of electric energy fed to the light pumping system of 80 joule/cm.$^3$.

These advantages of the proposed glass derive from the fact that the ions $Nd^{3+}$ and $Yb^{3+}$ enter the polymer structures formed by the metaphosphate chains which contribute to effective transfer of energy from $Nd^{3+}$ and $Yb^{3+}$, while for a large radius of modifiers in the glass (for example $Cd^{2+}$, $Pb^{2+}$, $Ba^{2+}$) they increase the section of stimulated emission of $Yb^{3+}$.

The addition of uranyl $UO_2^{2+}$ makes it possible to obtain the conditions of internal Q-modulation of the laser. During the excitation of light pumping, an additional absorption with a section at a wavelength $\lambda \cong 1066$ nm. of $3-5 \cdot 10^{-19}$ cm.$^2$ appears in the uranyl, which can be brightened by an intensive light flux.

In this case, the section of the brightening is $2 \cdot 10^{-20}$ cm.$^2$, and this is much higher than the section of stimulated emission of $Yb^{3+}$ at a wavelength $\lambda \cong 1060$ nm. so that the conditions of brightening are fulfilled.

The proposed composition includes glasses with zero, low positive and low negative thermo-optical coefficients and this is extremely important for development of high-power laser devices.

The proposed glass of the invention is produced by a conventional method including the following operations: preparation of a charge; smelting of the charge; melting of the glass mass, the latter stage including an operation of brightening of the glass with subsequent roasting of the obtained glass mass.

In this case the fusing temperature of the charge is 950–1300° C., while the roasting temperature of the glass mass is 300–500° C.

The charge is prepared by mixing the following components: metaphosphates or primary orthophosphates of Li, Na, K, Mg, Sr, Ba, Zn, Cd, Pb (40–90%) taken separately or in combination; phosphates of Al, Zn, B and Ce (5–50%) also taken separately or in combination depending on the composition and quality of the glass.

Trivalent ions of neodymium and ytterbium may be added into the charge in the form of oxides, fluorides, phosphates, nitrates and other compounds providing for neutral or oxidizing conditions to avoid the transition of $Yb^{3+}$ into $Yb^{2+}$.

The ion $UO_2^{2+}$ is added in the form of uranyl-nitrates, uranyl-chlorides and uranyl-fluorides.

Instead of metaphosphates, the starting components of the charge may be composed of oxides or oxygen compounds of Li, Na, K, Mg, Sr, Ba, Zn, Cd, Pb, and $P_2O_5$ taken in such a proportion that $Me_2O:P_2O_5$ and $MeO:P_2O_5$ are equal to unity.

In this case the metaphosphates are formed in the process of melting the charge.

Given below are compositions of glasses and descriptions of processes of preparation of a charge for these glasses.

EXAMPLE 1

The charge is taken in parts by weight:

| | |
|---|---|
| $Ba(H_2PO_4)_2$ | 56.0 |
| $Pb(PO_3)_2$ | 16.0 |
| $Al(PO_3)_3$ | 20.0 |
| $KPO_3$ | 9.0 |
| $CeO_2$ | 1.0 |
| $Nd_2O_3$ | 3.3 |
| $Yb_2O_3$ | 1.2 |

The glass comprises the following components, in percent by weight:

| | |
|---|---|
| $Ba(PO_3)_2$ | 50.0 |
| $Pb(PO_3)_2$ | 16.0 |
| $Al(PO_3)_3$ | 20.0 |
| $KPO_3$ | 9.0 |
| $CeO_2$ | 1.0 |
| $Nd^{3+}$ | 2.83 |
| $Yb^{3+}$ | 1.17 |

The obtained glass has the following characteristics: coefficient of thermal expansion $\alpha = 135.10^{-7}$ 1/deg.; a microhardnes of 300 kg./mm.$^2$; the quantum efficiency of transmission $Nd^{3+} \rightarrow Yb^{3+}$ is higher than 0.07; the life of the level of $Yb^{3+}$ is $1.4 \cdot 10^{-3}$ sec.; the section of stimulated emission of $Yb^{3+}$ at $\lambda = 1060$ nm. is equal approximately to $3 \cdot 10^{-21}$ cm.$^2$; the maximum inversion at electric energy of pumping of 80 joule/cm.$^3$ is $1.5 \cdot 10^{+19}$ 1/cm.$^2$.

EXAMPLE 2

The charge contains the following components, in percent by weight:

| | |
|---|---|
| $Ba(H_2PO_4)_2$ | 65.0 |
| $Pb(H_2PO_4)_2$ | 24.2 |
| $Al(PO_3)_3$ | 100.0 |
| $KH_2PO_4$ | 4.6 |
| $Nd_2O_3$ | 5.6 |
| $Yb_2O_3$ | 2.3 |

The obtained glass contains the following components, in percent by weight:

| | |
|---|---|
| $Ba(PO_3)_2$ | 58.0 |
| $Pb(PO_3)_2$ | 22.0 |
| $Al(PO_3)_3$ | 10.0 |
| $KPO_3$ | 4.0 |
| $Nd^{3+}$ | 4.0 |
| $Yb^{3+}$ | 2.0 |

The glass obtained is characterized by the following parameters: coefficient of thermal expansion $\alpha = 125 \cdot 10^{-7}$ 1/degree; the microhardness is 350 kg./mm.$^2$; the life of the level of $Yb^{3+}$ is $1.3 \cdot 10^{-3}$ sec.; the section of stimulated emission $Yb^{3+}$ at 1060 nm. is $\sim 4 \cdot 10^{-21}$ cm.$^2$; the quantum efficiency of transmission $Nd^{3+} \rightarrow Yb^{3+}$ is higher than 0.9; the maximum inversion at an electric pumping of 80 joule/cm.$^3$ is $2 \cdot 10^{+19}$ 1/cm.$^2$.

EXAMPLE 3

The charge contains the following components, in parts by weight:

| | |
|---|---|
| $Pb(PO_3)_2$ | 67.0 |
| $KH_2PO_4$ | 7.5 |
| $Nb_2O_5$ | 7.5 |
| $Nd_2O_3$ | 4.0 |
| $Yb_2O_3$ | 1.33 |
| $K_3UO_2F_5$ | 0.17 |

Glass is produced containing the following components, in percent by weight:

| | |
|---|---|
| $Pb(PO_3)_2$ | 67.0 |
| $KPO_3$ | 20.0 |
| $Nb_2O_5$ | 7.5 |
| $Nd^{3+}$ | 3.43 |
| $Yb^{3+}$ | 1.17 |
| $UO_2^{2+}$ | 0.1 |

The obtained glass is characterized by the following parameters: coefficient of thermal expansion $\alpha = 150 \cdot 10^{-7}$ 1/degree; the mirohardness is 280 kg./mm.$^2$; the quantum efficiency of transmission $Nd^{3+} \rightarrow Yb^{3+}$ is not less than 0.7; the section of stimulated emission at $\lambda \cong 1060$ nm. is $3.5 \cdot 10^{-20}$ cm.$^2$; the section of absorption introduced by the excited uranyl is $4 \cdot 10^{-19}$ cm.$^2$; the section of brightening is $4 \cdot 10^{-20}$ cm.$^2$; the maximum inverted population at an electric energy of pumping of 80 joule/cm.$^3$ is $1.5 \cdot 10^{+19}$ 1/cm.$^3$.

EXAMPLE 4

The charge contains the following components, in parts by weight:

| | |
|---|---|
| $Pb(PO_3)_2$ | 80.0 |
| $KPO_3$ | 5.0 |
| $Nb_2O_5$ | 9.0 |
| $Nd_2Ce_3$ | 5.3 |
| $YbCe_3$ | 1.7 |
| $UO_2(NO_3)_2 \cdot 6H_2O$ | 0.1856 |

Glass is obtained, containing the following components, in percent by weight:

| | |
|---|---|
| $Pb(PO_3)_2$ | 80.0 |
| $KPO_3$ | 5.0 |
| $Nb_2O_5$ | 9.0 |
| $Nd^{3+}$ | 3.8 |
| $Yb^{3+}$ | 1.5 |
| $UO_2^{2+}$ | 0.1 |

The obtained glass is characterized by the following parameters: thermal expansion coefficient $\alpha = 120 \cdot 10^{-7}$ 1/degree; the microhardness is 300 kg./mm.$^2$. The laser characteristics of this glass are equivalent to those of the glass obtained by Example 3.

EXAMPLE 5

The charge contains the following components, in parts by weight:

| | |
|---|---|
| $KPO_3$ | 55.0 |
| $H_3BO_3$ | 17.75 |
| $Mg(H_2PO_4)_2 \cdot 4H_2O$ | 47.8 |
| $CeO_2$ | 0.1 |
| $Nd_2O_3$ | 3.5 |
| $Yb_2O_3$ | 1.3 |
| $UO_2(NO_3)_2 \cdot 6H_2O$ | 0.1856 |

The obtained glass contains the following components, in percent by weight:

| | |
|---|---|
| $KPO_3$ | 55.0 |
| $B_2O_3$ | 10.0 |
| $Mg(PO_3)_2$ | 30.0 |
| $CeO_2$ | 0.1 |
| $Nd^{3+}$ | 3.0 |
| $Yb^{3+}$ | 1.14 |
| $UO_2^{2+}$ | 0.1 |

The glass has the following characteristics: thermal expansion coefficient $\alpha = 150 \cdot 10^{-7}$ 1/degree, the microhardness is 400 kg./mm.$^2$, the thermo-optical coefficient is $10^{-6}$ 1/degree, the section of stimulated emission of $Yb^{3+}$ at $\lambda = 1060$ $3 \cdot 10^{-21}$ cm.$^2$, the other laser parameters being close to those for the glass of Example 3.

EXAMPLE 6

The charge has the following composition, parts by weight:

| | |
|---|---|
| $KH_2PO_4$ | 69.2 |
| $H_3BO_3$ | 24.85 |
| $Mg(H_2PO_4)_2 \cdot 4H_2O$ | 31.9 |
| $CeO_2$ | 0.1 |
| $Nd_2O_3$ | 4.15 |
| $Yb_2O_3$ | 1.6 |
| $UO_2^{2+}$ | 0.15 |

The obtained glass contains the following components, in percent by weight:

| | |
|---|---|
| $KPO_3$ | 60.0 |
| $B_2O_3$ | 14.0 |
| $Mg(PO_3)_2$ | 20.0 |
| $CeO_2$ | 0.1 |
| $Nd^{3+}$ | 3.56 |
| $Yb_2O_3$ | 1.4 |
| $UO_2^{2+}$ | 0.15 |

The glass features the following characteristics: thermal expansion coefficient $\alpha = 160 \cdot 10^{-7}$ 1/degree, the micro-hardness is 350 kg./mm.$^2$, the laser characteristics of the glass being close to those of the glass of Example 5.

EXAMPLE 7

The charge contains, in parts by weight:

| | |
|---|---|
| $NaPO_3$ | 60.0 |
| $B_2O_3$ | 10.0 |
| $Mg(H_2PO_4)_2 \cdot 4H_2O$ | 36.4 |
| $CeO_2$ | 0.2 |
| $Nd_2O_3$ | 5.0 |
| $Yb_2O_3$ | 2.0 |

The obtained glass contains the following components, in percent by weight:

| | |
|---|---|
| $NaPO_3$ | 60.0 |
| $B_2O_3$ | 10.0 |
| $Mg(PO_3)_2$ | 22.8 |
| $CeO_2$ | 0.2 |
| $Nd^{3+}$ | 4.29 |
| $Yb^{3+}$ | 1.76 |

The obtained glass features the following characteristics: thermal expansion coefficient $\alpha = 130 \cdot 10^{-7}$ 1/degree, the microhardness is 450 kg./mm.$^2$, the thermo-optical coefficient is $+10^{-6}$ 1/degree, the quantum efficiency of transmission $Nd^{3+} \rightarrow Yb^{3+}$ is higher than 0.8, the section of stimulated emission is $3 \cdot 10^{-21}$ cm.$^2$, the maximum inverted population of $Yb^{3+}$ under the pumping conditions given in Example 1 is $2 \cdot 10^{+19}$ cm.$^{-3}$.

EXAMPLE 8

The charge contains the following components, in parts by weight:

| | |
|---|---|
| $Ba(NO_3)_2$ | 63.8 |
| $Al_2O_3$ | 3.47 |
| $BPO_4$ | 3.0 |
| $H_3PO_4$ | 77.5 |
| $CeO_2$ | 15.0 |
| $Nd_2O_3$ | 4.3 |
| $Yb_2O_3$ | 1.2 |

The obtained glass contains the following components, in percent by weight:

| | |
|---|---|
| $Ba(PO_3)_2$ | 72.0 |
| $Al(PO_3)_3$ | 18.0 |
| $BPO_4$ | 3.0 |
| $CeO_2$ | 1.5 |
| $Nd^{3+}$ | 3.69 |
| $Yb^{3+}$ | 1.155 |

The obtained glass has the following characteristics: thermal expansion coefficient $\alpha = 110 \cdot 10^{-7}$ 1/degree, the microhardness is 450 kg./mm.$^2$, the thermo-optical coefficient is $+4.7^{-7}$, the quantum efficiency of transmission $Nd^{3+} \rightarrow Yb^{3+}$, the section of stimulated emission is $4.5 \cdot 10^{-21}$ cm.$^2$, the maximum inverted population of $Yb^{3+}$ is $2 \cdot 10^{19}$ 1/cm.$^3$.

EXAMPLE 9

The charge contains the following components, in parts by weight:

| | |
|---|---|
| $Zn(H_2PO_4)_2 \cdot 2H_2O$ | 59.5 |
| $Cd(H_2PO_4)_2 \cdot 2H_2O$ | 49.3 |
| $LiH_2PO_4$ | 8.55 |
| $ZnO_2$ | 4.0 |
| $Nd_2O_3$ | 3.5 |
| $Yb_2O_3$ | 1.5 |

The obtained glass contains the following components, in percent by weight:

| | |
|---|---|
| $Zn(PO_3)_2$ | 45.0 |
| $Cd(PO_3)_2$ | 39.0 |
| $LiPO_3$ | 7.0 |
| $ZrO_2$ | 4.0 |
| $Nd^{3+}$ | 3.0 |
| $Yb^{3+}$ | 1.32 |

The obtained glass has the following characteristics: thermal expansion coefficient $\alpha = 50 \cdot 10^{-7}$ 1/degree, the quantum efficiency of transmission $Nd^{3+} \rightarrow Yb^{3+}$ is higher than 0.7, the section of stimulated emission of $Yb^{3+}$ at $\lambda = 1060$ nm. is $2.8 \cdot 10^{-21}$ cm.$^2$, the maximum inverted population of $Yb^{3+}$ is $1.5 \cdot 10^{+19}$ 1/cm.$^3$.

EXAMPLE 10

The charge, in parts by weight:

| | |
|---|---|
| $Zn(H_2PO_4)_2 \cdot 2H_2O$ | 26.5 |
| $Cd(H_2PO_4)_2 \cdot 2H_2O$ | 90 |
| $LiH_2PO_4$ | 2.44 |
| $ZrO_2$ | 2.0 |
| $Nd_2O_3$ | 3.5 |
| $Yb_2O_3$ | 1.5 |

The obtained glass contains the following components, in percent by weight:

| | |
|---|---|
| $Zn(PO_3)_2$ | 20.0 |
| $Cd(PO_3)_2$ | 71.0 |
| $LiPO_3$ | 2.0 |
| $ZrO_2$ | 2.0 |
| $Nd^{3+}$ | 3.0 |
| $Yb^{3+}$ | 1.32 |

The obtained glass has the following characteristics: thermal expansion coefficient $\alpha = 60 \cdot 10^{-7}$ 1/degree, the microhardness is 300 kg./mm.$^2$, the section of stimulated emission of $Yb^{3+}$ at $\lambda = 1060$ nm. is $3.5 \cdot 10^{-21}$ cm.$^2$, the other laser parameters being close to those given in Example 9.

EXAMPLE 11

The charge contains the following components, in parts by weight:

| | |
|---|---|
| $Ca(H_2PO_4)_2 \cdot H_2O$ | 19.05 |
| $Sr(H_2PO_4)_2$ | 74.6 |
| $Al(PO_3)_3$ | 15 |
| $Nd_2O_3$ | 3.5 |
| $Yb_2O_3$ | 1.5 |

The obtained glass contains the following components, in percent by weight:

| | |
|---|---|
| $Ca(PO_3)_2$ | 15 |
| $Sr(PO_3)_2$ | 65 |
| $Al(PO_3)_3$ | 15 |
| $Nd^{3+}$ | 3.0 |
| $Yb^{3+}$ | 1.32 |

The obtained glass has the following characteristics: thermal expansion coefficient $\alpha = 100 \cdot 10^{-7}$ 1/degree, the microhardness is 380 kg./mm.$^2$, the quantum efficiency of transmission $Nd^{3+} \rightarrow Yb^{3+}$ is at least 0.7, the section of stimulated emission at $\lambda = 1060$ nm. is $3.2 \cdot 10^{-21}$ cm.$^2$, the maximum inverted population of $Yb^{3+}$ under the pumping conditions given in the above example is $1.5 \cdot 10^{+19}$ 1/cm.$^3$.

EXAMPLE 12

The charge contains the following components, in parts by weight:

| | |
|---|---|
| $Ca(H_2PO_4)_2 \cdot H_2O$ | 50.9 |
| $Sr(H_2PO_4)_2$ | 40.1 |
| $Al(PO_3)_3$ | 10.0 |
| $Nd_2O_3$ | 3.5 |
| $Yb_2O_3$ | 1.5 |

The obtained glass contains the following components, in percent by weight:

| | |
|---|---|
| $Ca(PO_3)_2$ | 40.0 |
| $Sr(PO_3)_2$ | 35.0 |
| $Al(PO_3)_3$ | 10.0 |
| $Nd^{3+}$ | 3.0 |
| $Yb^{3+}$ | 1.32 |

The obtained glass has the following characteristics: the section of stimulated emission of $Yb^{3+}$ at $\lambda \cong 1060$ nm. is $2.7 \cdot 10^{-21}$ cm.$^2$. The other laser parameters are close to those given in Example 11.

We claim:

1. A glass for laser use comprising the following components, in percent by weight: 40–90% of metaphosphates selected from the group consisting of Li, Na, K, Zn, Cd, Ba, Pb, Mg, Ca, and Sr; 5–50% of phosphates of elements selected from the group consisting of Al, Zr, B, and Ce; 1–7% of trivalent neodymium $Nd^{3+}$; and 0.3–5% of trivalent ytterbium $Yb^{3+}$, said glass having a thermal expansion coefficient in the range of $50$–$160 \times 10^{-7}$ 1/degree, a microhardness in the range of 300–450 kg./mm.$^2$, a quantum efficiency of transmission of $Nd^{3+} \rightarrow Yb^{3+}$ higher than 0.7, the section of stimulated emission of ytterbium at $\lambda=1060$ nm. being equal to about $2.5-5 \times 10^{-21}$ cm.$^2$, and a maximum inversion at electric energy of pumping of 80 joules/cm.$^3$ is 1.5 to $2 \times 10^{19}$ 1/cm.$^2$.

2. Glass as claimed in claim 1, containing also uranyl $UO_2^{2+}$ in the amount of 0.1–1.0% by weight.

3. Glass as claimed in claim 1 containing at least one oxide selected from the group consisting of $Al_2O_3$, $B_2O_3$, $CeO_2$, and $Nb_2O_5$ in an amount of 0.5–20% by weight.

4. Glass as claimed in claim 1, containing the following components, in percent by weight:

| | |
|---|---|
| $Ba(PO_3)_2$ | 40–70 |
| $Pb(PO_3)_2$ | 10–25 |
| $KPO_3$ | 1–10 |
| $Al(PO_3)_3$ | 8–20 |
| $Nd^{3+}$ | 1–5 |
| $Yb^{3+}$ | 1–3 |

5. Glass as claimed in claims 1 and 3, containing the following components, in percent by weight:

| | |
|---|---|
| $Pb(PO_3)_2$ | 60–80 |
| $KPO_3$ | 5–25 |
| $Nb_2O_5$ | 1–10 |
| $Nd^{3+}$ | 1–5 |
| $Yb^{3+}$ | 1–3 |

6. Glass as claimed in claim 2, containing the following components, in percent by weight:

| | |
|---|---|
| $KPO_3$ | 50–80 |
| $Mg(PO_3)_2$ | 15–30 |
| $B_2O_3$ | 8–15 |
| $CeO_2$ | 0.1–2.0 |
| $Nd^{3+}$ | 2–5 |
| $Yb^{3+}$ | 1–4 |
| $UO_2^{2+}$ | 0.1–1.0 |

7. Glass as claimed in claim 3 containing the following components, in percent by weight:

| | |
|---|---|
| $NaPO_3$ | 50–80 |
| $Mg(PO_3)_2$ | 15–30 |
| $B_2O_3$ | 8–15 |
| $CeO_2$ | 0.2–2.0 |
| $Nd^{3+}$ | 2–5 |
| $Yb^{3+}$ | 1–4 |

8. Glass as claimed in claim 3, containing the following components, in percent by weight:

| | |
|---|---|
| $Ba(PO_3)_2$ | 60–80 |
| $Al(PO_3)_3$ | 10–30 |
| $BPO_4$ | 1–10 |
| $CeO_2$ | 0.5–3.0 |
| $Nd^{3+}$ | 1–5 |
| $Yb^{3+}$ | 1–3 |

References Cited
UNITED STATES PATENTS

| | | | |
|---|---|---|---|
| 3,580,859 | 5/1971 | Buzhinsky et al. | 252—301.4 P |
| 3,068,108 | 12/1962 | Geffcken | 106—47 Q |
| 3,281,253 | 10/1966 | Weidel | 106—53 |
| 3,328,181 | 6/1967 | Weidel | 106—47 Q |
| 3,455,707 | 7/1969 | Jahn | 106—47 Q |
| 3,516,939 | 6/1970 | Yohata et al. | 106—47 R |
| 3,549,554 | 12/1970 | Huayama | 106—47 R |
| 3,250,721 | 5/1966 | De Paolis et al. | 106—47 R |

WINSTON A. DOUGLAS, Primary Examiner

M. L. BELL, Assistant Examiner

U.S. Cl. X.R.

106—47 Q; 252—301.4 P